(12) United States Patent
Navarra Pruna

(10) Patent No.: US 10,682,794 B2
(45) Date of Patent: Jun. 16, 2020

(54) DEVICE FOR DEMOLDING NEGATIVES IN THERMOPLASTIC INJECTION MOLDS

(71) Applicant: COMERCIAL DE UTILES Y MOLDES, S.A., Sant Just Desvern (Barcelona) (ES)

(72) Inventor: Alberto Navarra Pruna, Sant Just Desvern (ES)

(73) Assignee: Comercial De Utiles Y Moldes, S.A., Sant Just Desvern (Barcelona) (ES)

( * ) Notice: Subject to any disclaimer, the term of this patent is extended or adjusted under 35 U.S.C. 154(b) by 29 days.

(21) Appl. No.: 15/915,662

(22) Filed: Mar. 8, 2018

(65) Prior Publication Data

US 2018/0257280 A1 Sep. 13, 2018

(30) Foreign Application Priority Data

Mar. 10, 2017 (ES) .................. P201730319

(51) Int. Cl.
*B29C 45/44* (2006.01)
*B29C 45/40* (2006.01)
*B29C 45/76* (2006.01)
*B29C 33/44* (2006.01)
*B29K 101/12* (2006.01)

(52) U.S. Cl.
CPC ........ *B29C 45/4435* (2013.01); *B29C 45/401* (2013.01); *B29C 45/4005* (2013.01); *B29C 45/4471* (2013.01); *B29C 45/4478* (2013.01); *B29C 45/7686* (2013.01); *B29C 33/442* (2013.01); *B29C 2045/445* (2013.01); *B29C 2045/4442* (2013.01); *B29K 2101/12* (2013.01)

(58) Field of Classification Search
CPC ............ B29C 45/4435; B29C 45/4005; B29C 45/4471; B29C 45/7686; B29C 45/4478; B29C 45/401; B29C 33/442
See application file for complete search history.

(56) References Cited

U.S. PATENT DOCUMENTS

| 3,642,417 A * | 2/1972 | Von Holdt ............ B29C 33/442 425/443 |
| 4,741,689 A * | 5/1988 | Onizawa .............. B29C 45/2608 249/160 |
| 2011/0020490 A1* | 1/2011 | Starkey ............... B29C 45/4435 425/556 |

OTHER PUBLICATIONS

European Search Report issued by the European Patent Office dated May 7, 2018 in connection with European Application No. EP 18 38 2143.

(Continued)

*Primary Examiner* — Xiao S Zhao
*Assistant Examiner* — Ninh V Le
(74) *Attorney, Agent, or Firm* — Gary J. Gershik; Cooper & Dunham LLP

(57) ABSTRACT

A device for demolding negatives in thermoplastic injection molds includes an ejector which comprises an ejector profile for the fastening thereof to an ejector plate and a figure insert with a profile that is complementary to a piece to be molded. The ejector further comprises a flexible element arranged between the ejector profile and the figure insert which pushes the figure insert in order to demold the negative by an angular displacement and stretches the figure insert so as to return the ejector to the injection position thereof. The device eliminates the need for molding sliders which are costly as well as the need for a machining process for the installation thereof.

3 Claims, 3 Drawing Sheets

(56) References Cited

OTHER PUBLICATIONS

Extended European Search Report dated May 14, 2018 in connection with European Application No. EP 18 38 2143.8, filed Mar. 29, 2010.
Spanish Patent Application P201730319 filed on Mar. 10, 2017 (Alberto Navarra Pruna) (including English Language, Abstract).

* cited by examiner

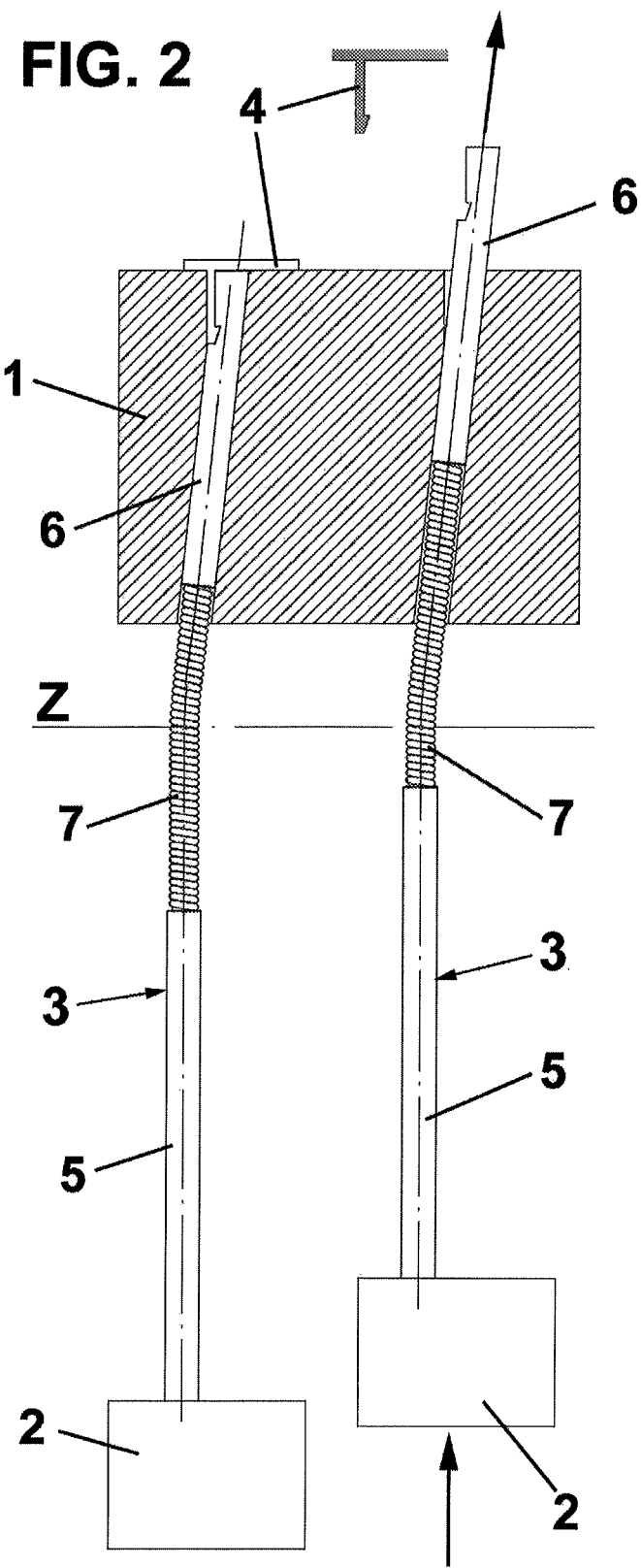

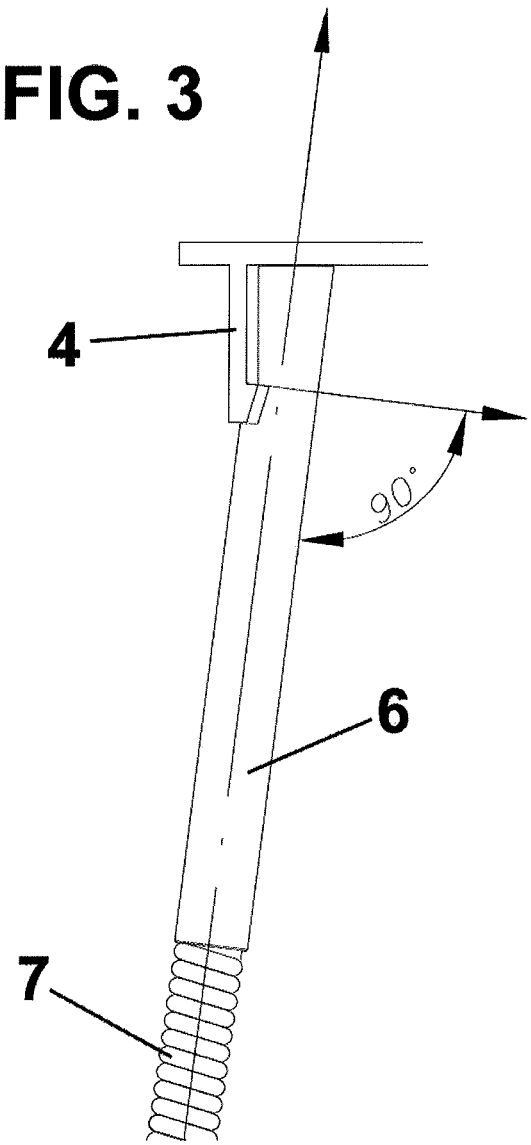

… … … … …

DEVICE FOR DEMOLDING NEGATIVES IN THERMOPLASTIC INJECTION MOLDS

The present invention relates to a device for demolding negatives in thermoplastic injection molds.

BACKGROUND OF THE INVENTION

In molding any type of injected piece, it is necessary to extract the piece from the punch of the mold, for which cylindrical ejectors are used, which when properly installed in ejector plates and actuated by the injection machine allow the piece of the mold to be demolded.

In molds which, due to the structure of the injected piece, have areas that do not allow for direct demolding, due to the fact that part of the geometry of the piece has negative zones, it is necessary to install devices known as inclined sliders.

These devices installed on the punch of the mold are always activated by ejector plates at the moment of ejection, by means of inclined bars that slide through the punch of the mold and move by means of sliding mechanisms, fixed to the ejector plates.

In order for the ejection system with the inclined bars to be possible, we have to couple a sliding mechanism that converts the perpendicular movement to the opening of the mold in an angular movement in order to allow these bars to move with the angles in which they have been machined in the mold.

Basically, these mechanisms consist of a sliding body, which slides through friction structures that are fastened to the ejector plates and which, by means of properly machined housings, house the inclined bars with the angles which, being correctly calculated, correspond to each negative to be demolded. The inclined bars move within the punch of the mold during the ejection cycle, and according to the machined angle, the demolding required is obtained, in other words, for each depth of the negative, the angle to be machined must be adjusted.

When the piece to be injected has different areas with negatives of different dimensions, the process gets more complicated, automatically making the development of the project and the machining of the mold more expensive, and furthermore, in many cases the complexity of the design can become further complicated by the different angles required, as well as by the spaces available for installing these devices, since when dealing with inclined holes, the dimensional projection of the same requires much greater surfaces.

When these elements must be installed in small molds, for example in negatives with a maximum of 3 mm., where the dimensions are much smaller, there are a greater number of problems, due to a lack of vital spaces which are necessary for the installation of the system.

In utility model ES1031883U of the same holder as the present application, a molder-ejector accessory for injection molds is described, intended to act as a molding complement for small negatives. This utility model describes a rod fixed to the ejection plate of the mold and provided with a head or figure insert, the form of which coincides with the piece to be obtained. Said head is joined to the rod by means of an elastically deformable neck that allows for the lateral movement of the head with respect to the rod.

The solution we propose is to standardize a very similar system, with regard to the installation in the mold, since it requires minimum space, but which will perform the movements of the demolding by means of sliding that will be carried out through the angular holes machined in the punch of the mold, instead of using the force of the spring, as in the case of the aforementioned utility model, completely doing without the previously mentioned sliders, hence, these spaces, the costly sliders, and the painstaking machining processes for the installation thereof in the molds are no longer required.

DESCRIPTION OF THE INVENTION

The device of the invention resolves the aforementioned drawbacks and has other advantages which are described below.

The device for demolding negatives in thermoplastic injection molds according to the present invention includes an ejector that comprises:
 an ejector profile for the fastening thereof to an ejector plate; and
 a figure insert with a complementary profile to the piece to be molded,
and is characterized in that said ejector further comprises a flexible element arranged between the ejector profile and the figure insert, which pushes said figure insert in order to demold the negative by means of angular displacement and stretches said figure insert so as to return the ejector to the injection position thereof.

Advantageously, said flexible element is a non-compressible helical spring, in other words, the coils thereof are always in contact with one another at least at one point, complemented by a cable installed on the inside thereof, and tensioned such that it prevents the spring from extending.

Said flexible element is joined to the figure insert and to the ejecting profile by means of a connection portion, and thus the assembly is converted into a single mechanism.

In other words, it is an ejector that can be housed in the ejecting plates through a simple hole, just as a conventional ejector, but with a particular feature in that this ejector comprises a traction-compression element with a specific length, which is neither compressible nor extendable. Therefore, this ejector has the particular feature in that, due to the central structure thereof, being a flexible area that joins both ends, it becomes a mechanical worm that adapts its geometry to the different holes through which it must slide.

In the mold, we must machine the inclined hole that we need in the punch, while in the ejector plates we will machine the housing hole for the perpendicular fastening thereof to the same.

When we actuate the ejector plates, they will move perpendicularly in a normal fashion, pushing the ejector worm, which has the figure insert incorporated on the opposite end, which will move through the inclined hole, thus following the direction which has been machined.

With this system we are able to get the angular movements to accurately follow the established line, while the sliding of the ejector plates is conventional or, in other words, does not have any additional cost.

BRIEF DESCRIPTION OF THE DRAWINGS

For the purpose of helping to make the foregoing description more readily understandable, it is accompanied by a set of drawings which, schematically and by way of illustration and not limitation, represent an embodiment.

FIG. 2 is a cross-section elevation view of a mold that comprises the device for demolding negatives in thermoplastic injection molds according to the present invention, in its position of injection on the left-hand side and in its position of ejection on the right-hand side; and FIG. 3 is an elevation view of the detail of the area of the figure insert and the piece during the demolding thereof.

DESCRIPTION OF A PREFERRED EMBODIMENT

Figure 1:
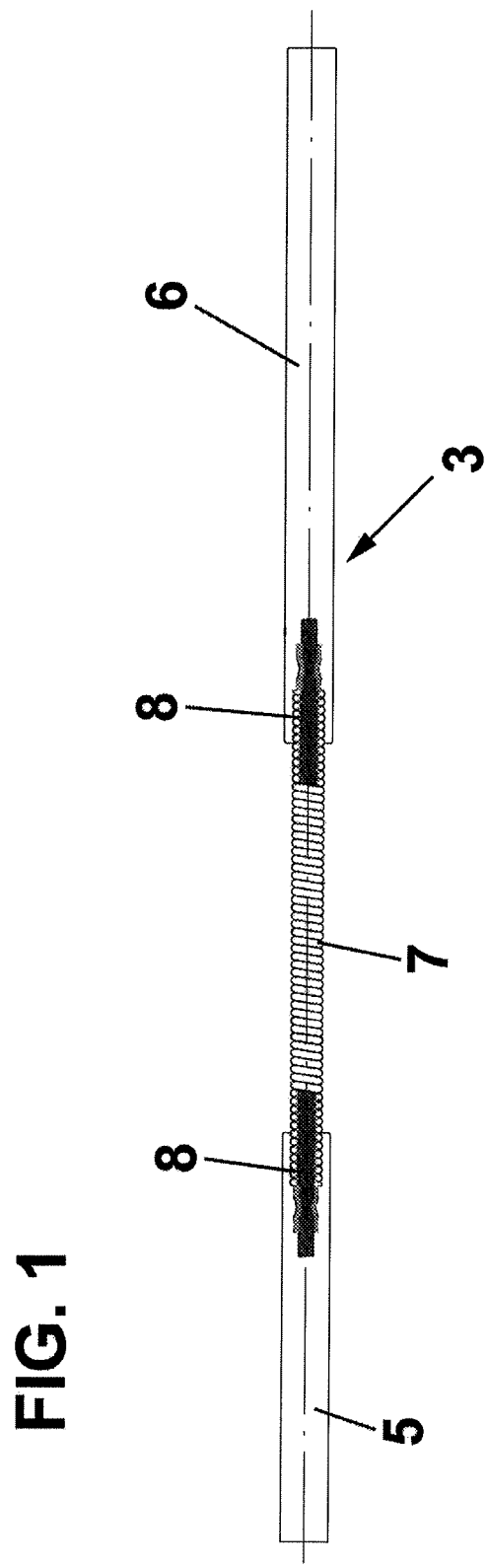
FIG. 1 is a view of the components of the device for demolding negatives in thermoplastic injection molds according to the present invention.

Firstly, it must be stated that the device in accordance with the present invention is used for demolding negatives that are normally considered small, meaning with dimensions smaller than 3 mm in the negative area thereof.

FIG. 1 shows the components that make up the device in accordance with the present invention, referred to in its entirety as an ejector and identified with the reference number 3, in order to facilitate the description.

This ejector comprises an ejector profile 5 fixed to an ejector plate 2 of the mold 1, as can be seen in FIG. 2, a figure insert 6 that has a form that is complementary to the piece 4 to be molded, and a flexible element 7.

According to the embodiment shown, said flexible elements 7 is a helical spring complemented with an integral cable, in which the coils thereof are in contact with each other at least at one point. In other words, said element is not compressible or extendable, but rather deforms to adapt to the form of the housing of the mold through which it moves, as will be described below.

The function of said flexible element 7 is to push said figure insert 6 in order to demold the negative by means of angular displacement and stretch said figure insert 6 so as to return the ejector 3 to the injection position thereof.

To facilitate this pushing and stretching action of the flexible element 7, the same is joined to the ejector profile 5 and to the figure insert 6 by means of a threaded, welded or fitted connection portion 8, which converts it to a single demolding element, as shown in FIG. 1.

FIG. 2 shows a mold 1 that includes the device for demolding negatives according to the present invention.

In a conventional way, said mold comprises an ejector plate 2, to which the ejector 3 is attached.

This ejector 3 is housed in an angular housing machined in the punch of the mold 1, and as can be seen in FIG. 2, to allow for the demolding of the pieces with a negative configuration.

Said housing has a polygonal cross section, for example, square, in other words, non-circular, to prevent the rotation of the figure insert 6 in the inside thereof. To this end, the figure insert 6 also defines a corresponding polygonal cross section.

On the left-hand side of FIG. 2, the mold 1 is shown in its injection position, while on the right-hand side the mold is shown in its ejection position.

In the punch of the mold 1 the trajectory of the movement of the ejector device is machined, which adapts its path thanks to the flexible element 7, and on the one hand, the profile of the figure follows the trajectory machined in the punch of the mold, while the other connection fitted in the ejector plate will follow the trajectory of the ejector plates.

It is important to highlight that the system described is perfectly adapted to for the demolding of small elements, mainly by facilitating the machining and installation thereof, but that its use is not suitable for large demolding, by the simple fact that in all cases it is a single deformable element that is neither compressible nor extendable, and, therefore, one part of the same can follow a vertical path, while the other part can follow an inclined path in relation to the former, and thus the vertical paths are different, although on a small scale, and always within the tolerances of the operations within the sector. FIG. 3 graphically shows the demolding effect The demolding process by means of the device in accordance with the present invention is described below.

As can be seen on the left-hand side of FIG. 2, in this position the injection of the mold 1 is carried out, and the flexible element 7 has a lower vertical portion and an upper inclined portion. It must be stated that in this embodiment the coils of the helical spring are in contact with each other in their entirety with the exception of in the transition zone from the lower vertical portion to the upper inclined portion, where the coils are in contact at one point.

When one wants to eject or demold the piece, the ejector plate 2 moves vertically upwards. This movement also causes the sliding of the flexible element 7 upwards, also defining a lower vertical portion and an upper inclined portion in the same. As can be seen in FIG. 2, said transition zone (indicated by the letter Z in FIG. 2) is always at the same height with respect to the mold 1.

The push that the flexible element 7 exerts on the figure insert 6 causes the movement of the demolding that is shown in FIG. 3, which forms a right angle with respect to the direction of the movement of the ejector 3, in other words, with respect to the longitudinal axis of the figure insert 6.

Once the piece 4 is demolded, the ejector plate 2 will return to its injection position, such that the flexible element 7 stretches the figure insert 6 to its injection position, shown on the left-hand side of FIG. 2.

Despite the fact that reference has been made to a specific embodiment of the invention, it is evident for a person skilled in the art that numerous variations and changes may be made to the device described, and that all the aforementioned details may be substituted by other technically equivalent ones, without detracting from the scope of protection defined by the attached claims.

The invention claimed is:

1. A device for demolding one or more negatives in thermoplastic injection molds, said device including an ejector (3) that comprises:
    an ejector profile (5) for fastening thereof to an ejector plate (2); and
    a figure insert (6) with a profile that is complementary to a piece (4) to be molded, said piece (4) having said one or more negatives,
    wherein said ejector (3) also comprises a flexible element (7) arranged between said ejector profile (5) and said figure insert (6), which pushes said figure insert (6) in order to demold said one or more negatives by means of an angular displacement, said ejector (3) thereafter returning to an injection position thereof, and
    wherein said flexible element (7) is a helical spring that is not compressible or extendable.

2. The device for demolding one or more negatives in thermoplastic injection molds according to claim 1, wherein said helical spring is combined with a cable, forming a single flexible element (7).

3. The device for demolding one or more negatives in thermoplastic injection molds according to claim 1, wherein said flexible element (7) is joined to said figure insert (6) and to said ejector profile (5) by means of a connection portion (8).

* * * * *